United States Patent
Gaddam et al.

(10) Patent No.: US 10,417,542 B2
(45) Date of Patent: *Sep. 17, 2019

(54) MOBILE DEVICE WITH SCANNABLE IMAGE INCLUDING DYNAMIC DATA

(71) Applicant: VISA INTERNATIONAL SERVICE ASSOCIATION, San Francisco, CA (US)

(72) Inventors: Ajit Gaddam, Sunnyvale, CA (US); Gyan Prakash, Foster City, CA (US); Selim Aissi, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 15/687,846

(22) Filed: Aug. 28, 2017

(65) Prior Publication Data

US 2017/0357885 A1 Dec. 14, 2017

Related U.S. Application Data

(63) Continuation of application No. 14/823,567, filed on Aug. 11, 2015, now Pat. No. 9,779,345.

(60) Provisional application No. 62/035,694, filed on Aug. 11, 2014.

(51) Int. Cl.
*G06K 19/06* (2006.01)
*H04N 1/32* (2006.01)

(52) U.S. Cl.
CPC ........ *G06K 19/06112* (2013.01); *G06K 19/06* (2013.01); *G06K 19/06037* (2013.01); *G06K 19/06103* (2013.01); *H04N 1/32117* (2013.01); *H04N 2201/3269* (2013.01)

(58) Field of Classification Search
CPC combination set(s) only.
See application file for complete search history.

(56) References Cited

U.S. PATENT DOCUMENTS

| | | | |
|---|---|---|---|
| 5,450,491 A | 9/1995 | McNair | |
| 7,753,294 B2* | 7/2010 | Sugawara | B02C 18/0007 241/101.2 |
| 8,136,724 B1 | 3/2012 | Aidasani | |
| 8,924,292 B1 | 12/2014 | Ellis | |
| 9,396,376 B1 | 7/2016 | Narayanaswami | |
| 9,779,345 B2* | 10/2017 | Gaddam | G06K 19/06112 |
| 10,198,782 B1* | 2/2019 | Bradley | G06T 1/0064 |
| 2001/0034717 A1 | 10/2001 | Whitworth | |

(Continued)

FOREIGN PATENT DOCUMENTS

WO   2014/130222 A1   8/2014

OTHER PUBLICATIONS

U.S. Appl. No. 14/834,028, filed by Eduardo Lopez Aug. 24, 2015. (Unpublished.).

*Primary Examiner* — Daniel I Walsh
(74) *Attorney, Agent, or Firm* — Kilpatrick Townsend & Stockton LLP

(57) ABSTRACT

A mobile phone is disclosed. The mobile phone may receive a first request to generate an initial scannable image, and a second request to generate modified scannable image. The modified scannable image can include a static portion that corresponds to a static portion of the initial scannable image. The modified scannable image may also include another portion that has a different appearance than a corresponding portion of the initial scannable image.

17 Claims, 9 Drawing Sheets

(56) References Cited

U.S. PATENT DOCUMENTS

| | | | |
|---|---|---|---|
| 2002/0060246 A1* | 5/2002 | Gobburu | G06Q 20/04 235/462.46 |
| 2003/0230630 A1 | 12/2003 | Whipple | |
| 2004/0024709 A1* | 2/2004 | Yu | G06Q 20/105 705/43 |
| 2004/0117254 A1 | 6/2004 | Nemirofsky | |
| 2004/0260608 A1 | 12/2004 | Lewis | |
| 2005/0008261 A1* | 1/2005 | Wolff | G06F 17/30817 382/305 |
| 2006/0054695 A1* | 3/2006 | Owada | G06K 7/1095 235/440 |
| 2006/0144946 A1* | 7/2006 | Kuriyama | G06K 7/1095 235/462.1 |
| 2006/0215931 A1* | 9/2006 | Shimomukai | G06K 1/121 382/284 |
| 2006/0278698 A1* | 12/2006 | Lovett | G06Q 20/24 235/380 |
| 2007/0001858 A1* | 1/2007 | Bae | H04M 1/72519 340/572.7 |
| 2007/0244811 A1 | 10/2007 | Tumminaro | |
| 2008/0040285 A1 | 2/2008 | Wankmueller | |
| 2008/0158588 A1* | 7/2008 | Haas | G07B 17/00508 358/1.15 |
| 2008/0210754 A1 | 9/2008 | Lovett | |
| 2009/0108056 A1 | 4/2009 | Faust | |
| 2009/0116074 A1* | 5/2009 | Wilsher | H04N 1/32133 358/3.28 |
| 2009/0132344 A1 | 5/2009 | Otto | |
| 2009/0204530 A1* | 8/2009 | Hanson | G06Q 20/10 705/35 |
| 2009/0276347 A1* | 11/2009 | Kargman | G06Q 20/32 705/35 |
| 2009/0277968 A1* | 11/2009 | Walker | G06Q 20/347 235/494 |
| 2009/0327138 A1* | 12/2009 | Mardani | G06Q 20/10 705/64 |
| 2010/0133334 A1 | 6/2010 | Vadhri | |
| 2010/0228577 A1 | 9/2010 | Cunningham | |
| 2010/0228988 A1 | 9/2010 | Walker | |
| 2010/0279610 A1 | 11/2010 | Bjorhn | |
| 2010/0312630 A1 | 12/2010 | Krutchik | |
| 2011/0101109 A1 | 5/2011 | Bona | |
| 2011/0239508 A1* | 10/2011 | Honda | G09F 3/0288 40/638 |
| 2011/0251892 A1 | 10/2011 | Laracey | |
| 2011/0302089 A1* | 12/2011 | McKenzie | G06Q 20/3274 705/75 |
| 2012/0138679 A1* | 6/2012 | Doyle | G06K 19/06037 235/380 |
| 2012/0138693 A1 | 6/2012 | Litz | |
| 2012/0187185 A1 | 7/2012 | Sayan | |
| 2012/0209749 A1 | 8/2012 | Hammad | |
| 2013/0001291 A1* | 1/2013 | Ibrahimbegovic | H04L 63/0823 235/375 |
| 2013/0041831 A1 | 2/2013 | Das | |
| 2013/0080289 A1* | 3/2013 | Roy | G06Q 10/10 705/26.8 |
| 2013/0112760 A1* | 5/2013 | Schory | G06K 19/06037 235/494 |
| 2013/0157760 A1* | 6/2013 | Boudville | G06K 7/12 463/31 |
| 2013/0238455 A1* | 9/2013 | Laracey | G06Q 20/108 705/21 |
| 2013/0320099 A1 | 12/2013 | Acton | |
| 2013/0326333 A1 | 12/2013 | Hashmi | |
| 2014/0014721 A1 | 1/2014 | Shima | |
| 2014/0040139 A1 | 2/2014 | Brudnicki et al. | |
| 2014/0084059 A1 | 3/2014 | Sierchio | |
| 2014/0214665 A1 | 7/2014 | Lee | |
| 2014/0229379 A1 | 8/2014 | Jang | |
| 2014/0263623 A1 | 9/2014 | Robison | |
| 2014/0282961 A1 | 9/2014 | Dorfman | |
| 2014/0330656 A1 | 11/2014 | Zhou | |
| 2015/0012305 A1 | 1/2015 | Truskovsky | |
| 2015/0046336 A1* | 2/2015 | Cummins | G06Q 20/3829 705/65 |
| 2015/0088674 A1* | 3/2015 | Flurscheim | G06Q 20/3276 705/17 |
| 2015/0095998 A1 | 4/2015 | Christmas | |
| 2015/0120472 A1 | 4/2015 | Aabye et al. | |
| 2015/0161496 A1 | 6/2015 | Rodriguez | |
| 2015/0213660 A1 | 7/2015 | Bergdale | |
| 2015/0248665 A1 | 9/2015 | Walz | |
| 2015/0324766 A1 | 11/2015 | Park | |
| 2016/0042263 A1* | 2/2016 | Gaddam | G06K 19/06112 235/494 |
| 2016/0063484 A1* | 3/2016 | Carpenter | G06Q 20/322 705/41 |
| 2016/0080364 A1* | 3/2016 | Karimzadeh | G06F 21/34 726/6 |
| 2017/0104893 A1* | 4/2017 | Hardy | G06F 21/629 |
| 2018/0225701 A1* | 8/2018 | Han | H04M 1/725 |

\* cited by examiner

US 10,417,542 B2

MOBILE DEVICE WITH SCANNABLE IMAGE INCLUDING DYNAMIC DATA

CROSS-REFERENCES TO RELATED APPLICATIONS

This application is a continuation application of U.S. application Ser. No. 14/823,567, filed Aug. 11, 2015, which claims the benefit of U.S. Provisional Application No. 62/035,694, filed Aug. 11, 2014, which is incorporated by reference in its entirety for all purposes.

BACKGROUND

QR codes have been used to encode access credentials (e.g., payment credentials such as a primary account number) to access a resource (e.g., goods or services at a merchant, access to an airplane, etc.). In some cases, a QR code may be displayed on a user's phone well in advance of the time that the user may actually use the QR code. When the QR code is displayed in this manner, there is a chance that the QR code may be stolen by a third party and possibly used. For example, a user may intend to use a QR code that is displayed on the user's phone and that encodes a payment account number to pay for an item. The user may stand in line waiting for his turn to pay at the merchant's POS terminal. Well prior to arriving at the POS terminal, the user may have caused the mobile phone to generate the QR code. While standing in line, the user may be holding the mobile phone in a position (e.g., with the display facing outward from the user) that can allow an unauthorized person to take a picture of the QR code. Once the unauthorized person takes the picture of the QR code, it is possible for the user to use the QR code to make purchases with it. More secure ways of generating and using QR codes, or other scannable images, are therefore needed.

Embodiments of the invention address this and other problems, individually and collectively.

BRIEF SUMMARY

Embodiments of the present invention relate to systems and methods for utilizing dynamic data in scannable images such QR codes to improve the security associated with the use of such scannable images.

One embodiment of the invention is directed to a method comprising receiving, by a mobile device comprising a processor, and an input element and a display coupled to the processor, a first request for an initial scannable image. The method also comprises generating, by the mobile device, the initial scannable image, the initial scannable image comprising a first image portion comprising a static image and a second image portion associated with executable code. The method also includes receiving a second request for a modified scannable image, and after receiving the second request, executing, by the mobile device, the executable code associated with the second image portion to form a modified second image portion. The method also includes displaying, by a display in the mobile device, the modified scannable image, the modified scannable image comprising the first image portion comprising the static image and the modified second image portion. The modified second image portion in the modified scannable image has a different appearance than the second image portion in the initial scannable image.

Another embodiment of the invention is directed to a mobile device comprising a processor, a display coupled to the processor, and a memory element comprising code, executable by the processor, for implementing a method. The method comprises receiving and an input element and a display coupled to the processor, a first request for an initial scannable image, generating the initial scannable image, the initial scannable image comprising a first image portion comprising a static image and a second image portion associated with executable code. The method also comprises receiving a second request for a modified scannable image, and after receiving the second request, executing the executable code associated with the second image portion to form a modified second image portion. The method also includes displaying, on the display, the modified scannable image, the modified scannable image comprising the first image portion comprising the static image and the modified second image portion. The modified second image portion in the modified scannable image has a different appearance than the second image portion in the initial scannable image.

These and other embodiments of the invention are described in further detail below.

DETAILED DESCRIPTION

Figure 1:
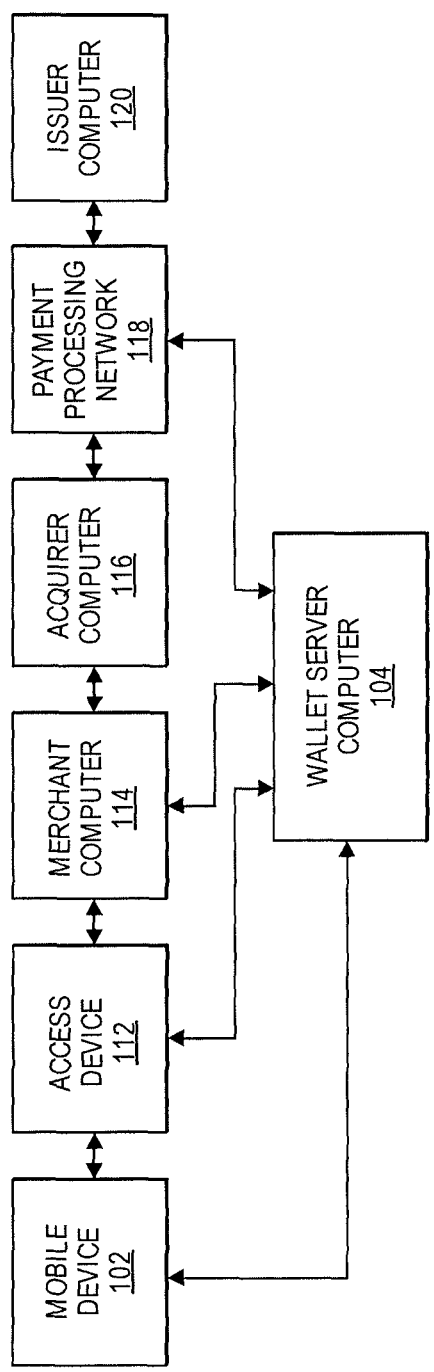
FIG. 1 shows a block diagram of a system according to an embodiment of the invention.

One embodiment of the invention is directed to a method comprising receiving, by a mobile device comprising a processor, and an input element and a display coupled to the processor, a first request for an initial scannable image. The initial scannable image may be in the form of a QR code. The method also comprises generating, by the mobile device, the initial scannable image. The initial scannable image may comprise a first image portion comprising a static image and a second image portion associated with executable code. The method also includes receiving a second request for a modified scannable image, and after receiving the second request, executing, by the mobile device, the executable code associated with the second image portion to form a modified second image portion. The method also includes displaying, by a display in the mobile device, the modified scannable image, the modified scannable image comprising the first image portion comprising the static image and the modified second image portion. The modified second image portion in the modified scannable image has a different appearance than the second image portion in the initial scannable image.

A "mobile device" may include any suitable device that can be carried by a user. A mobile device may be mobile phone, keychain device, personal digital assistant (PDAs), pager, tablet computer, laptop computer, wearable device (e.g., smart watches, fitness bands, jewelry, etc.), an automobile with remote communication capability, a payment card, etc. A mobile device may also include a secure element that can be implemented in either hardware and/or software, which may store sensitive account or personal information.

A "scannable image" may include any suitable image that may be scanned to a scanner such as an optical scanner. Examples of scannable images may be machine readable codes, which may be one or two-dimensional. In some cases, a machine readable code is encoded using a Base64 encoding scheme. An example of a machine readable code may include a QR code, which may be made of a number of squares or modules. Some of those squares must not be covered or edited for the QR code to work correctly. The three large squares are the position markers which indicate the scanner where the edges of the code are. One or more smaller square are the alignment markers that act as reference points for the scanner. In some cases, alternating black and white modules are the timing patterns that define the positioning of the rows and columns. Some sections of the code define the format, i.e., they indicate to the scanner whether it is a website (URL), a text message, numbers, Chinese symbols or the combination thereof. In some cases, a version number is marked by some of the modules. The amount of data that can be stored in a QR code depends on the input character set, version and the error correction level. As an example, up to 4296 alphanumeric characters may be stored in one QR code. QR codes can be created with built-in error correction algorithms that allow them to be scanned even if a few bytes are missing, edited or covered. However, the storage capacity goes down with higher error correction level. The number of bytes that can be edited may be based on the version number. In some embodiments, a visible design may be embedded in the QR code utilizing the error correction algorithms to imply a seal of certification.

An "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device.

A "processor" may include a device that can process computer readable code. An exemplary processor may be a central processing unit (CPU). A processor can include a single-core processor, a plurality of single-core processors, a multi-core processor, a plurality of multi-core processors, or any other suitable combination of hardware configured to perform arithmetical, logical, and/or input/output operations of a computing device.

A "computer readable medium" (e.g., a non-transitory computer readable medium) may comprise any suitable medium that can store computer code. It may store pure data such as account numbers or it may store computer executable code, which may be executed by a processor to accomplish an intended operation of a computer or device. Examples of computer readable media include memory chips, memory sticks, disk drives, and other types of memory devices. Such memory devices may operate using any suitable electrical, optical, electro-magnetic, etc. mechanism for data storage.

An "authorization request message" may be an electronic message that is sent to a payment processing network and/or an issuer of a payment account to request authorization for a transaction. An authorization request message according to some embodiments may comply with ISO 8583, which is a standard for systems that exchange electronic transaction information associated with a payment made by a consumer using a payment device or a payment account. In some embodiments of the invention, an authorization request message may include a payment token, an expiry date, a token presentment mode, a token requestor identifier, an application cryptogram, and assurance level data. The payment token may include a payment token issuer identifier that may be a substitute for a real issuer identifier for an issuer. For example, the real issuer identifier may be part of a BIN (bank identification number) range associated with the issuer. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include an authorization code, which may be a code that a credit card issuing bank returns in response to an authorization request message in an electronic message (either directly or through the payment processing network) to the merchant's access device (e.g. POS terminal) that indicates approval of the transaction. The code may serve as proof of authorization. As noted above, in some embodiments, a payment processing network may generate or forward the authorization response message to the merchant.

A "token" may include an identifier for a payment account that is a substitute for an account identifier, such as a primary account number (PAN). For example, a token may include a series of alphanumeric characters that may be used as a substitute for an original account identifier (e.g., a pseudo account number). For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "server computer" may typically be a powerful computer or cluster of computers. For example, the server computer can be a large mainframe, a minicomputer cluster, or a group of servers functioning as a unit.

I. Exemplary Systems and Devices

FIG. 1 shows a system according to an embodiment of the invention. The system may include a mobile device 102 that may be used at an access device 112. The access device 112 may be a point of sale (POS) terminal. The access device 112 may be in communication with a merchant computer 114 (or may be part of the merchant computer 114). The merchant computer 114 may be in communication with an acquirer computer 116, a payment processing network 118, and/or an issuer computer 120. A wallet server computer 104 may be in communication with the mobile device 102, the access device 112, the merchant computer 114, and the payment processing network 118. The wallet server computer 104 could also be in communication with the acquirer computer 116 and/or the issuer computer 120 in other embodiments of the invention.

The computers, networks, and devices shown in FIG. 1 and described herein may communicate using any suitable communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a support secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The wallet server computer 104 may be a computer that manages a digital wallet on behalf of the user of the mobile device 102. Further details regarding an exemplary wallet server computer 104 are provided below with respect to FIG. 3.

The access device 112 may be configured to interact with the mobile device 102, and may also be configured to generate an authorization request message. The access device 112 may include an optical scanner that can read a scannable image on a display of a mobile device.

The acquirer computer 116 may be a computer that is operated by an acquirer, which may maintain an account of a merchant operating the merchant computer 114. The acquirer computer 116 may be disposed between (in operational manner) the acquirer computer 116 and the issuer computer 120.

The payment processing network 118 may include data processing subsystems, networks, and operations used to support and deliver authorization services, exception file services, and clearing and settlement services. For example, the payment processing network 118 may comprise a server computer, coupled to a network interface (e.g. by an external communication interface), and a database(s) of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 118 may use any suitable wired or wireless network, including the Internet.

The issuer computer 120 may be operated by an issuer. The issuer can be a bank and may hold an account of the user of the mobile device 102.

Figure 2:
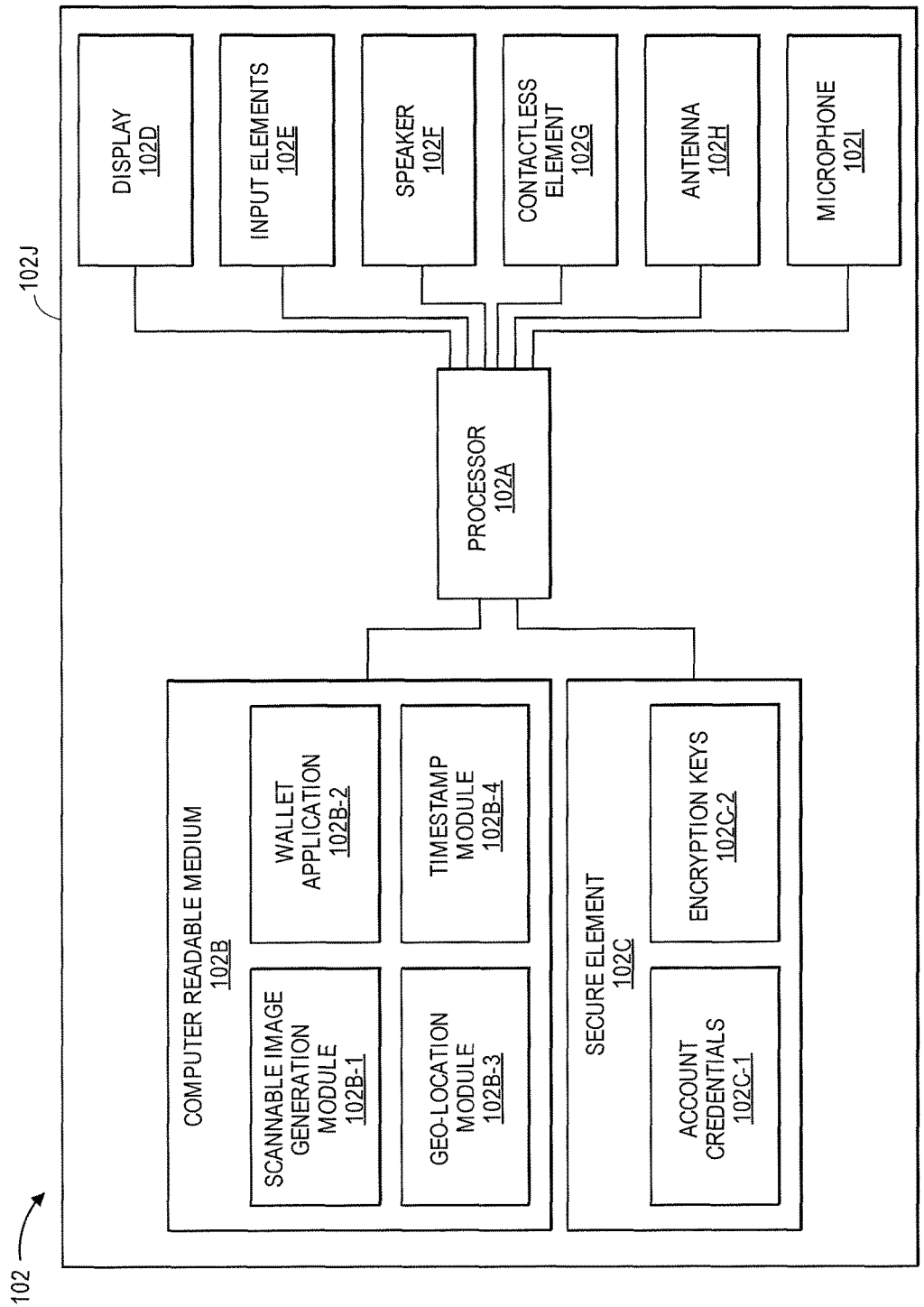
FIG. 2 shows a block diagram of some components of a mobile device according to an embodiment of the invention.

FIG. 2 shows a block diagram illustrating some components in an exemplary mobile device 102. The mobile device 102 may comprise a processor 102A and a computer readable medium 102B within a body (or outer casing) 102J. The body 102J may be in the form a plastic substrate, housing, or other structure. The computer readable medium 102B could alternatively be detachable from the device (e.g. the computer readable medium 102B could comprise an external memory that could be connected through a physical interface such as a USB connection, or the data could be hosted remotely and accessed wirelessly by the device—e.g. the data could be hosted and stored at a remoter server in the "cloud").

The computer readable medium 102B may be in the form of a memory that stores data. The memory may store information such as financial information, transit information (e.g., as in a subway or train pass), access information (e.g., access badges), serial numbers, mobile account information, and any other suitable information. In general, any of this information may be transmitted by the mobile device 102 to the access device 112, via any suitable method, including the use of antenna 102H or contactless element 102G.

In some embodiments, the mobile device 102 may further include a contactless element 102G, which is typically implemented in the form of a semiconductor chip (or other data storage element) with an associated wireless transfer (e.g., data transmission) element, such as an antenna. Contactless element 102G may be coupled to (e.g., embedded within) the mobile device 102 and data or control instructions that are transmitted via a cellular network may be applied to the contactless element 102G by means of a contactless element interface (not shown). The contactless element interface functions to permit the exchange of data and/or control instructions between the mobile device circuitry and an optional contactless element 102G, or between another device having a contactless element (e.g. a POS terminal or a payment device). Contactless element 102G may be capable of transferring and receiving data using a short range wireless communication capability. As noted above, mobile device 102 may comprise components to both be the interrogator device (e.g. receiving data) and the interrogated device (e.g. sending data). Thus, the mobile device 102 may be capable of communicating and transferring data or control instructions via both cellular network (or any other suitable wireless network—e.g. the Internet or other data network) and short range communications.

The processor 102A (e.g., a microprocessor) can be used for processing the functions of the mobile device 102. A display 102D that is coupled to the processor 102A can allow a consumer to see phone numbers and other information and messages. The mobile device 102 may further include input elements 102E to allow a user to input information into the mobile device 102, a speaker 102F to allow the user to hear voice communication, music, etc., and a microphone 102I to allow the user to transmit her voice through the mobile device 102. The mobile device 102 may also include an antenna 102H for wireless data transfer (e.g., data transmission).

The mobile device 102 may also include a secure element 102C coupled to the processor 102A. A secure element (SE) may include its own data processor and memory and may be a tamper-resistant platform (typically a one chip secure microcontroller) capable of securely hosting applications and their confidential and cryptographic data (e.g. key management) in accordance with the rules and security requirements set forth by a set of well-identified trusted authorities. There can be three different form factors of SE: Universal Integrated Circuit Card (UICC), embedded SE and microSD. Both the UICC and microSD are removable.

In FIG. 2, the secure element 102C may comprise account credentials 102C-1 and one or more encryption keys 102C-2. In other embodiments, a secure element 102C is not needed and the account credentials 102C-1 and the one or more encryption keys 102C-2 may be securely stored in a normal memory device in the mobile device 102 or may be stored in a remote server (e.g., in the cloud). If they are stored on a remote server, they may be stored in a virtual secure element in some embodiments of the invention.

The computer readable medium 102B may include one or more software modules and/or applications. For example, the computer readable medium 102B may be a scannable image generation module 102B-1, a wallet application 102B-2, a geo-location module 102B-3, and a timestamp module 102B-4.

The scannable code generation module 102B-1 may comprise any suitable computer code, that when executed by the processor 102A, can generate a scannable image such as a QR code.

The wallet application 102B-2 may comprise any suitable software, executable by the processor 102A, that provides front end functionality of the electronic wallet to the user. For example, the wallet application 102B-2 may be embodied as a software application downloadable by the mobile device 102. In some instances, the wallet application 102B-2 may provide a user interface (such as a series of menus or other elements) that allows the user to manage his electronic wallet(s). In some embodiments, the wallet application 102B-2 may store data in a computer readable memory for later use, such as user preferences or identifiers associated with funding sources added to the electronic wallet.

The geo-location module 102B-3 may comprise code, which when executed by the processor 102A, can determine a location of the mobile device 102. The geo-location module 102B-3 may be part of a GPS device within the mobile device 102 that can provide location data through a GPS process. It could alternatively determine a location using other means including an IP address or signal strength from a nearby network node. Location data can be expressed in any suitable manner including latitude and longitude, by zip code, by city, by address, street, etc.

The timestamp module 102B-4 may comprise code, which when executed by the processor 102A, can determine the time and/or date at which an action may be performed by the mobile device 102. The timestamp module 102B-4 may work in conjunction with a clock (not shown) in the mobile device 102.

Figure 3:
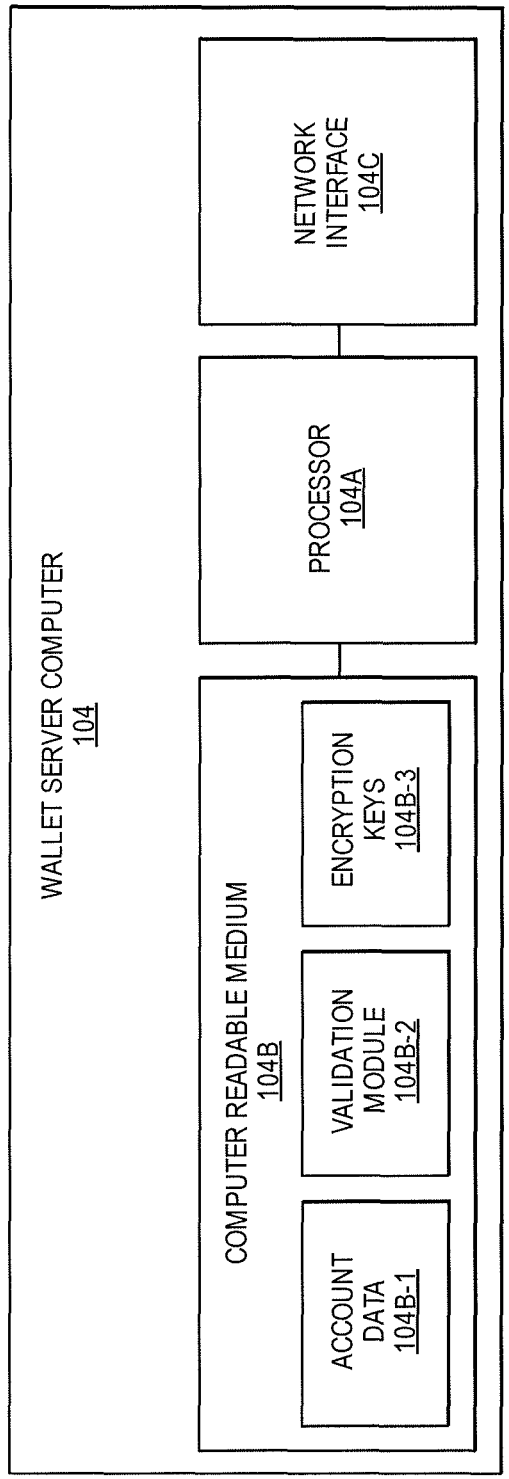
FIG. 3 shows a block diagram of some components of a wallet server computer according to an embodiment of the invention.

FIG. 3 shows a wallet server computer 104 comprising a processor 104A coupled to a computer readable medium 104B. The computer readable medium 104B comprises account data 104B-1, a validation module 104B-2, and encryption keys 104B-3. A network interface 104C may also be coupled to the processor 104A.

The wallet server computer 104 may be programmed to provide some or all of the functionality associated with conducting transactions using an electronic wallet, including maintaining an association between the user's e-wallet and one or more payment accounts (such as a bank account or credit card account). To provide electronic wallet services (i.e. the use of the electronic wallet associated with a payment account to conduct a financial transaction), the wallet server computer 104 may further provide a web interface (e.g. through one or more web pages) to receive and transmit requests for payments services and/or may provide an application program interface (API).

The account data 104B-1 may include information associated with the user's payment accounts can be used in conducting a financial transaction with a merchant. For example, account data 104B-1 may comprise primary account numbers of one or more payment accounts (e.g., payment accounts associated with a credit card, debit card, etc.) of the user. In other embodiments, account data 104B-1 may include payment tokens instead of account data.

The validation module 104 may work with the processor 104A to validate the modified scannable image, and the functions performed are described in detail below. It may utilize encryption keys 104B-3 and previously stored account data 104B-1 to verify the data derived from a modified scannable image. Verification of the modified scannable image may include determining if the modified scannable image was provided by the rightful or authentic mobile device and/or user.

II. Exemplary Methods

A method according to the embodiments of the invention can be described with respect to FIGS. 1-6.

Figure 4:
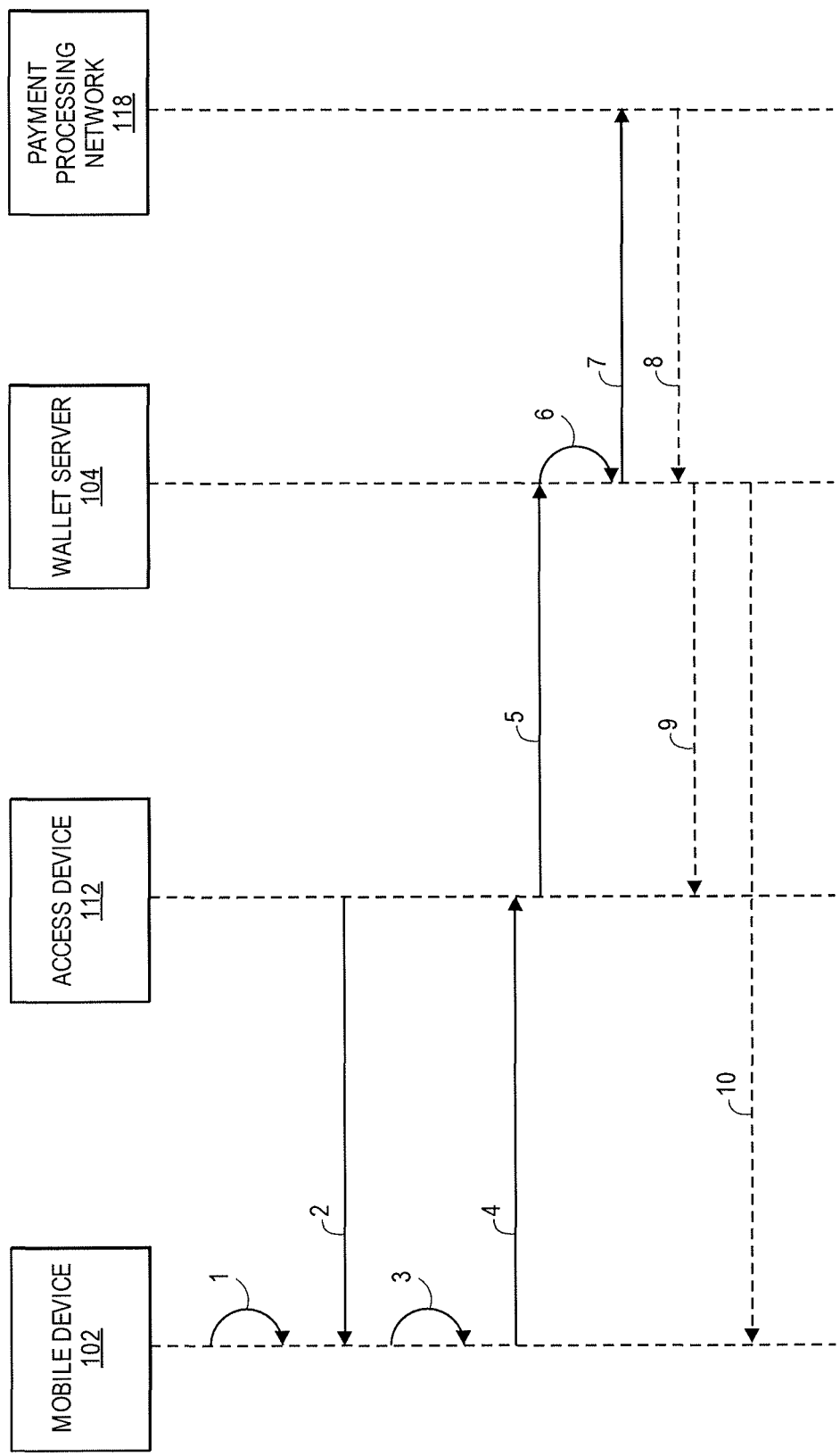
FIG. 4 shows a flow diagram of a method for conducting a payment transaction with a scannable image on a mobile device according to an embodiment of the invention.

FIG. 4 shows a flow diagram illustrating a transaction process according to an embodiment of the invention.

Initially, a user (not shown) may operate a mobile device 102 and may wish to access a resource. For example, the user of the mobile device 102 may want to pay for a good or service at a merchant operating the access device 112. Prior to arriving at the access device 112, the user may launch the wallet application 102B-2 on the mobile device 102.

In step 1, once the wallet application 102B-2 is launched, the mobile device 102 may receive a first request for an initial scannable image (e.g., a QR code) from the user. The request for the initial scannable image may take any suitable form. For example, the user may request that the mobile device 102 generate the initial scannable image by selecting a hardware or software button on the mobile device. Alternatively, the user could provide an authentication credential such a biometric sample (e.g., a voice sample, an iris scan, a fingerprint) to the mobile device 102 and this may constitute a request for an initial scannable image.

In some embodiments, transaction information may be provided to the mobile device prior to receiving the request. The transaction information can include at least one of account identification information (e.g., an account number and expiration date, or a payment token), a transaction amount, a location from which the generated scannable image was requested, a device that from which the generated scannable image was requested, a merchant name, and a time at which the scannable image was requested.

The transaction information may have been provided to the mobile device 102 in any suitable manner. For example, in some embodiments, at least some of the transaction information may be been received by the mobile device 102 from the access device 112, by the mobile device 102 through user data input (e.g., keying in an account number), and/or by the mobile device 102 retrieving information from an internal memory or secure element 102C. Some transaction information could also have been additionally or alternatively provided to the mobile device 102 over the air.

Figure 5:
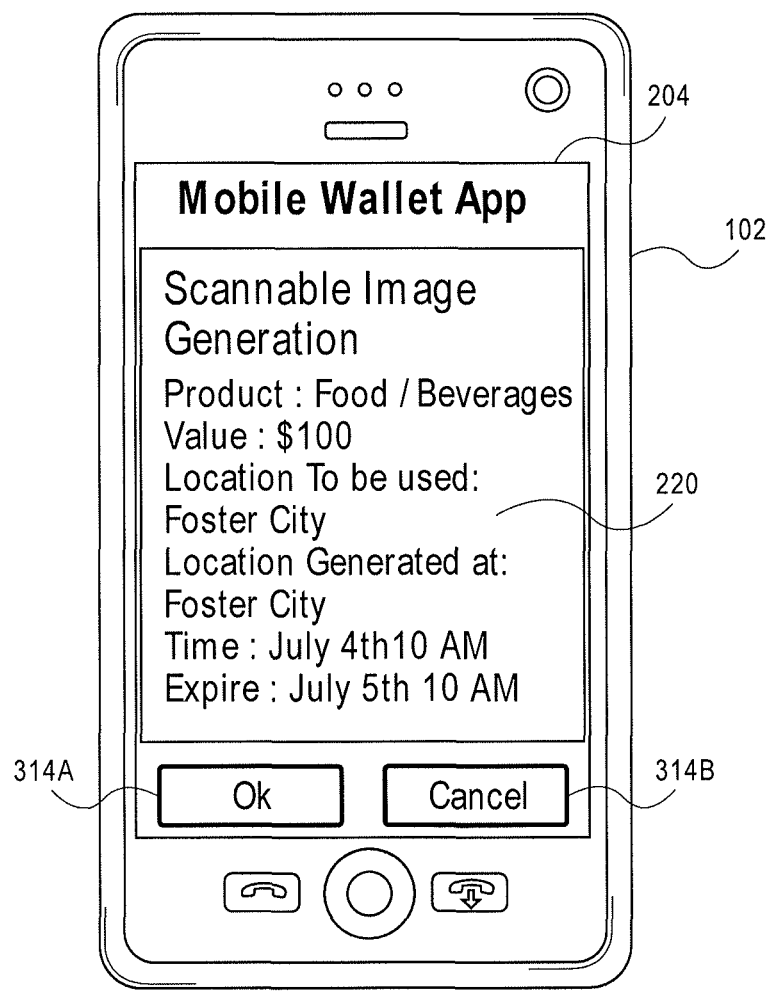
FIG. 5 shows a mobile device displaying a request for input from a user to generate an initial scannable image according to an embodiment of the invention.

Illustratively, FIG. 5 shows a mobile wallet application 204 running on a mobile device 102. The mobile wallet application 204 may display or provide input elements 314A, 314B to allow the user to interactively request and generate scannable images such as QR codes, or cancel the scannable image generation process. As shown in FIG. 5, prior to generating the initial scannable image, transaction information 220 may be displayed on the display of the mobile device 102. In other embodiments, the transactional information 220 need not be displayed by the mobile device 102 to the user. Some or all of the transaction information 220 may be encoded and/or encrypted in the subsequently generated scannable images.

In order to carry out a transaction, the user initiates a first request to the mobile wallet application 204 to generate an initial scannable image (e.g., an initial QR code). The user may select one or more input elements 314A (e.g., the "OK" button) to confirm the request to generate an initial scannable image. The user may initiate the generation of the initial scannable image (e.g., initial QR code) in advance of the purchase transaction or during the purchase transaction.

Figure 6B:
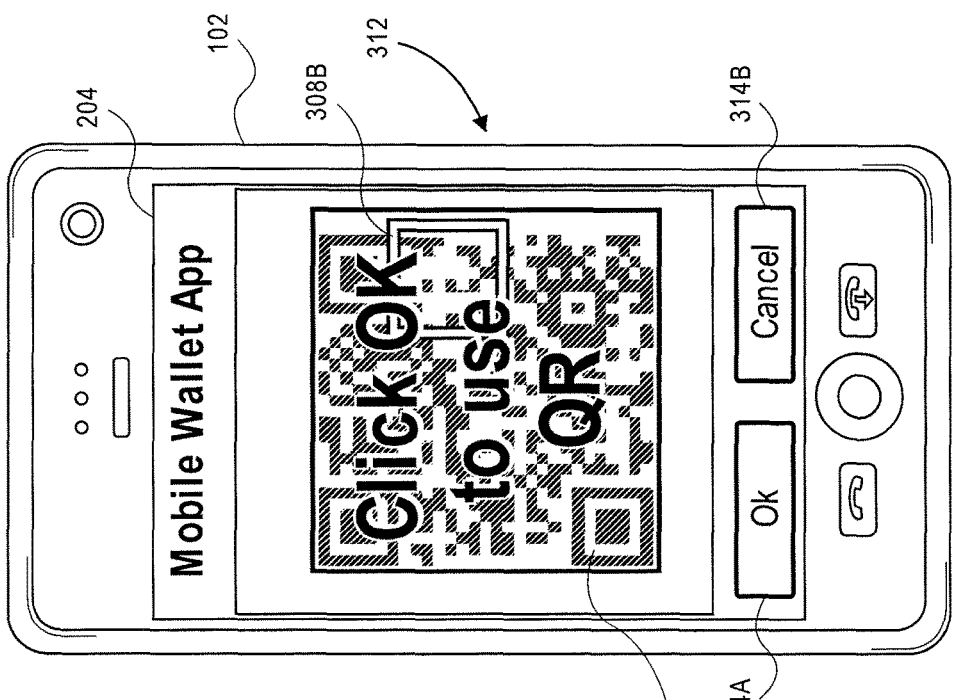
FIG. 6B shows a mobile device with a prompt prior to generating a modified scannable image according to an embodiment of the invention.
Figure 6A:
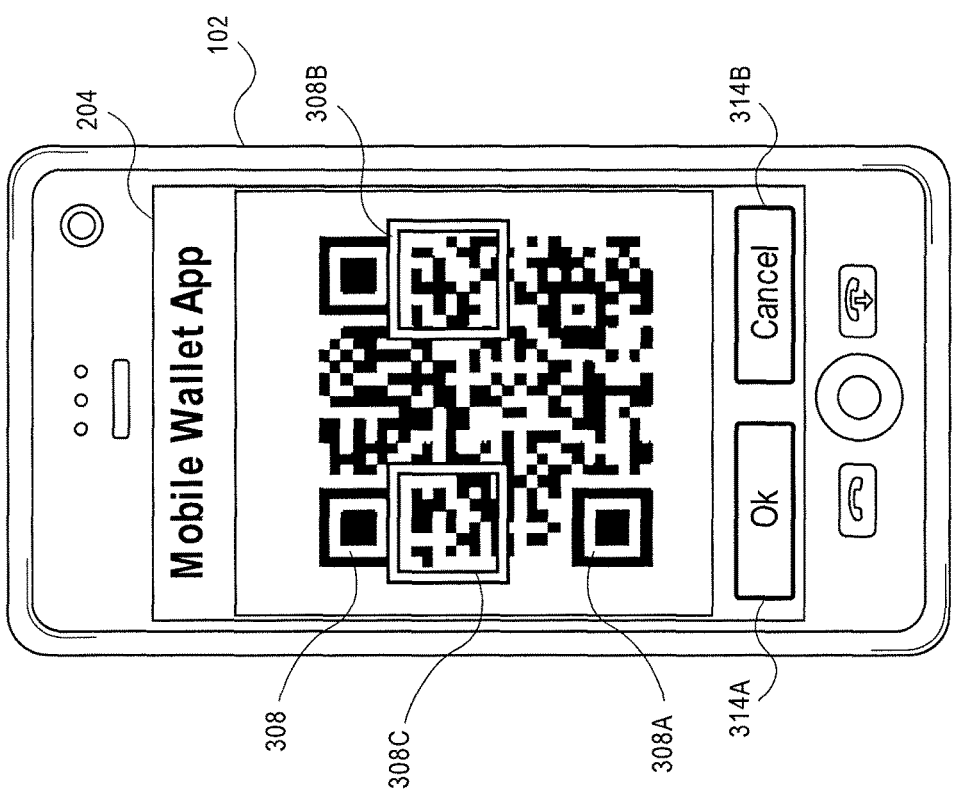
FIG. 6A shows a mobile device displaying an initial scannable image according to an embodiment of the invention.

Also in step 1, after the request to generate the initial scannable image is received by the mobile device 102, the mobile device 102 may generate the initial scannable image 308 as shown in FIG. 6A. The initial scannable image 308 may have been generated prior to a time that a user of the mobile device 102 actually presents the mobile device 102 to the access device 112.

The initial scannable image 308 may be generated in any suitable manner. For example, the scannable image generation module 102B-1, in conjunction with the processor 102A, can generate the initial scannable image 308 using data from various sources. For example, the scannable image generation module 102B-1, in conjunction with the processor 102A, can retrieve data including the account credentials 102C-1 and the encryption keys 102C-2 from the secure element 102C, a geolocation of the mobile device 102 using the geo-location module 102B-3, and the time of the request using the timestamp module 102B-4. This data and other data may be encoded using the scannable image generation module 102B-1 and the processor 102A and converted into the initial scannable image 308. Further details on how data such as this is used to generate the initial scannable image 308 is provided below.

The initial scannable image 308 may comprise a first image portion 308A, a second image portion 308B, and a third image portion 308C. The first, second, and third image portions 308A, 308B, 308C may have any suitable shape and may occupy any suitable portion of the initial scannable image.

The first image portion 308A may comprise a static image. The first image portion 308A may also be static in nature, in that the image does not change between the initial scannable image and a subsequently generated modified scannable image. It may contain and encode transaction data such as payment account data. Payment account data may include a payment account number such as a credit card number (or a payment token), an expiration date, service code, and a verification value such as a CVV, CVV2, DCVV, and DCVV2. Such information may have been previously stored in the secure element in the mobile device 102C. The first image portion 308A may also comprise information such as a first name and last name of the user of the mobile device 102, as well as a transaction amount. Such information may be in the clear, since this information can be used by a merchant or other party to process the transaction.

The second image portion 308B can be dynamic in nature and may be associated with executable code. It can be dynamic in the sense that the image portion associated with it changes between the initial and modified scannable images. The executable code may be stored on a computer readable medium in the mobile device 102 and may cause the image in the second image portion 308B to be modified. In the initial scannable image 308, the second image portion 308B may comprise no encoded data, or it may encode data similar to the data that is described below in the third image portion 308C, but it may be in the clear instead of being encrypted. For example, in some embodiments, information such as the location of the mobile device 102 at the time of the initial request, the merchant name, information about the device that the initial scannable image is requested from, and information about the time of the initial request may be present in the second image portion 308B. However, it may be in the clear instead of encrypted as in the third image portion 308C. In other embodiments, the information encoded in the second image portion 308B may be different than the information that is encrypted in the third image portion 308C. For example, the second image portion 308B might encode information such as a counter value, and the counter value may not be present in the third image portion 308C.

The third image portion 308C may encode encrypted metadata. The encrypted metadata may include information such as the location from which the initial scannable image was requested, the device from which the initial scannable image was requested, the merchant name, and the time the initial scannable image was requested, in encrypted form. At least some of the encrypted metadata (e.g., when the initial scannable image was requested) may relate to a time, T1, when the request for the initial scannable image 308 was made. Any suitable encryption algorithm including DES, triple DES, or AES may be used to encrypt the metadata. An encryption key (e.g., a symmetric encryption key) 102C-2 may be used to encrypt the metadata. The third image portion 308C may also be static in nature, in that the image does not change between the initial scannable image and a subsequently generated modified scannable image.

Figure 7:
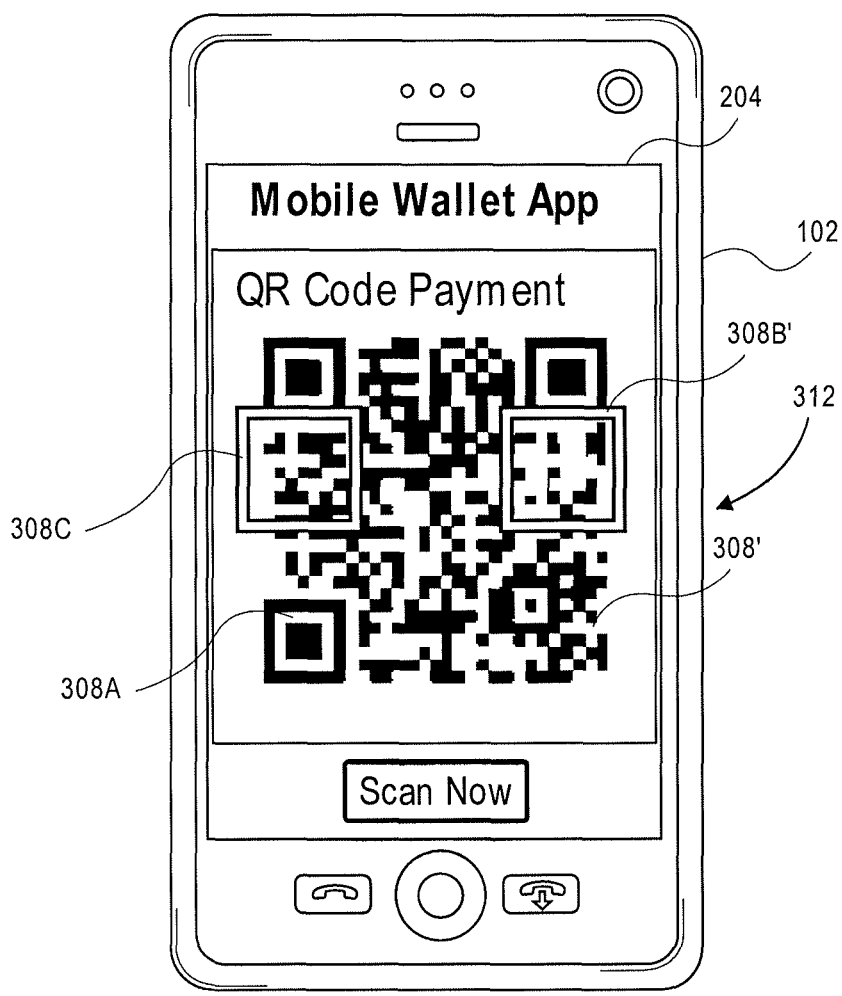
FIG. 7 shows a mobile device displaying a modified scannable image according to an embodiment of the invention.

As shown in FIG. 6B, after the initial scannable image 308 is generated, the mobile device 102 may prompt the user to express an intent to actually use the initial scannable image 308 to pay for a good or service. The prompt take any suitable form including a sound or other communication that signals to the user that the user needs to confirm use of the scannable image to conduct the transaction. In some embodiments, as shown in FIG. 6B, an overlay 312 which states "Click OK to use QR code" can be shown on the mobile device 102. The initial scannable image 308 may not be used until the user confirms his intent to use the scannable image. As noted above, the use of a semi-transparent or transparent overlay can prevent the use of the initial scannable image from being used. After the user selects the input element 314A labeled "Ok," the overlay may be removed as shown in FIG. 7.

At step 2, the user may receive a request for payment from the access device 112. This may simply be a message that is displayed to the user to have the access device 112 scan a scannable image that is displayed on the mobile device 102. It may alternatively be a signal that is sent from the access device 112 to the mobile device 102.

At step 3, the mobile device 102 receives a second request for a modified scannable image from the user. The second request may be similar to or different in nature than the first request.

After receiving the second request, the mobile device 102 executes executable code associated with the second image portion to form a modified second image portion. In some embodiments, the input element 314A may be selected and this may execute the executable code on the computer readable medium in the mobile device 102. The mobile device 102 then generates and displays, by a display in the mobile device, the modified scannable image 308'. For example, after selecting the input element 314A (OK button) shown in FIG. 6B, a modified scannable image 308' like the one shown in FIG. 7 is generated.

The modified scannable image 308' comprises the first image portion 308A, a modified second image portion 308B', and the third image portion 308C. The first image portion 308A in the modified scannable image 308' may have the same appearance as the first image portion in the initial scannable image 308. The modified second image portion 308B' in the modified scannable image 308' has a different appearance than the second image portion 308B in the initial scannable image 308. The third image portion 308C in the modified scannable image 308' may have the same appearance as the third image portion 308C in the initial scannable image 308. Although specific configurations are described, embodiments of the invention are not limited to the specifically described configurations. For example, the first image portion 308A could include encrypted and/or dynamic data in addition to or instead of clear text data.

The modified second image portion 308B' may comprise dynamic information. Dynamic information encoded by the modified second image portion 308B' may include information regarding the location and time that the modified scannable image is being used for the purchase, the device that the modified scannable image is generated on, and the merchant name. The dynamic information may relate to a subsequent time, T2, when the modified scannable image was requested. While the mobile device 102 that the initial scannable image is requested from and the device that the modified scannable image that is used for the transaction are usually the same device, they may be separate devices in other embodiments of the invention.

As noted above, the modified second image portion 308B' of the modified scannable image 308' may contain a dynamic component that may change over time (e.g., when the user is ready to use the mobile device to conduct a transaction). Once dynamic code associated with the second image portion 308B is executed, the executable code (e.g., Java script) generates output data, which results in an altered image in the modified second image portion 308B'. The altered image in the modified second image portion 308B' may contain graphics or values that are different from those of the second image portion 308B in the initial scannable image 300 as a result of the alteration of the underlying data. The executable code may alter or update information such as the location that the scannable image is being used, the device on which the scannable image resides, and/or the time the scannable image 308 is used. Dynamic data such as this may be verified by a remote server computer using data stored in the server computer or supplemental data received an authorization request message along with the barcode data. For example, the time that the modified scannable image 308' was used may be compared with a time provided by an access device, and these values may be compared by a remote server to authenticate the transaction.

In other embodiments, the dynamic portion of the scannable image may simply be a verification value (e.g., a dCVV) that changes for each transaction that is conducted. In such embodiments, the second image portion 308B of the initial scannable image 308 may encode, with the image, a verification value such as "457." Once the executable code in the modified scannable image portion 309 is executed, a counter or over value may be changed, and a new verification value such as "989" may be produced as a result. The image portion that encodes a number such as "989" will have a different appearance than the image portion that encode a number such as "457." In other embodiments, the dynamic portion could simply be the counter, which increments each time the executable code is executed.

The changing information provided by the modified second image portion 308B' of the modified scannable image 308' may bind the modified scannable image 308 to a single wallet application, since running that code in an application utilized by a third party will generate a static image instead of a dynamic one. Since the generated initial scannable image in this case will not contain the updated altered image in the modified second image portion 308B necessary for authorization, the transaction will be declined if it is used by an unauthorized party.

In some embodiments, after the modified scannable image 308' is utilized in a transaction, but the modified second image portion 308B' may stay intact for a certain number of transactions. Yet, a limitation on the number of times the code can run may be set. For example, there may be a limitation in which the executable code can be executed five times before it becomes invalidated and the user must stop using it.

At step 4, the access device 112 may scan the modified scannable image 308'. The access device 112 may treat the payment token data as normal card data and utilize the payment data and metadata read and decoded from the scannable image to generate a payment authorization request message. The authorization request message may contain any of the data encoded by the modified scannable image 308'. It may also include information independently obtained or generated by the access device 112. Such information might include a merchant ID, and a time stamp or geo-location of the transaction (as generated and observed by the access device 112).

At step 5, the access device 112 may send the authorization request message to the wallet server computer 104, along with any other suitable information from the access device 112 (e.g., a merchant identifier or the location of the access device 112). The wallet server computer 104 may receive the payment data and metadata, which includes the encrypted metadata and clear text metadata. It may also receive the dynamic data encoded by the modified second image portion 308B'.

When the access device 112 sends the decoded information to the wallet server computer 104, it could, but need not be the form of a traditional authorization request message in a normal payment card transaction (an ISO 8583 type message). For example, the authorization request message may be transmitted using a support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like.

At step 6, after receiving the decoded information from the access device 112, the wallet server computer 104 may validate the received data in the authorization request message. For example, in some embodiments, the received information may comprise the clear text information from the first image portion 308A, the clear text dynamic information from the second image portion 308B, and the encrypted metadata from the third image portion 308C. The wallet server computer 104 may then decrypt the encrypted metadata using an appropriate encryption key (e.g., a private key) 104B-3.

The validation of the received data may occur in any suitable manner. For example, if the location that the scannable image was requested from (encoded and encrypted in the third image portion) and the location that the scannable image was used (in the second image portion), significantly differ from each other, or significantly differs from the location of the access device 112, then the wallet server computer 104 may determine that the transaction is not trustworthy since all locations should match or correspond to each other. For example, if the location information from the third image portion and the second image portion are Foster City, Calif. and Foster City, Calif., respectively, and the location information from the access device is San Francisco, Calif., then this may suggest that the modified QR code is not being received from an authentic user or mobile device, because the location of the access device should have been the same or similar to the location identified in the second image portion. In another example, if the location information from the third image portion and the second image portion are Foster City, Calif. and San Francisco, Calif., respectively, and the timestamps associated with the third and second image portions are 12:00 pm and 12:05 pm, respectively, then the modified scannable image may be unverified or untrustworthy. In this case, it is possible that the initial scannable image was stolen in Foster City, Calif. (e.g., either through a hacked phone or by an unauthorized person surreptitiously taking a picture of it) and was subsequently transmitted to another phone in San Francisco, Calif.

In another example, if the time that the scannable image was requested from (encoded and encrypted in the third image portion) and the time that the scannable image was used (in the second image portion), significantly differ from each other (e.g., a difference of over a week), or significantly differs from the time obtained from the access device 112, then the wallet server computer 104 may determine that the transaction is not trustworthy since the different times should substantially match. On the other hand, if the time that the scannable image was requested from (encoded and encrypted in the third image portion) and the time that the scannable image was used (in the second image portion) match exactly, then this may indicate that the scannable image was obtained by an unauthorized person, since the times should have differed by a small amount (e.g., 10 minutes).

In yet other embodiments, the location and/or time of the mobile device 102 during each of the scannable image generation requests may be obtained by the wallet server computer 104 through a different communication channel (e.g., over a cellular network), and this location and/or time data may be compared with location and/or time data received from the access device 112 to determine the authenticity of the transaction.

In other embodiments, the modified scannable image 308B' may be regenerated and compared with the received modified scannable image. Since the wallet server computer 104 already knows the encrypted metadata and executable code associated with the user's wallet application when it receives the modified scannable image, it may regenerate scannable image based on that information. If the generated scannable image matches the one that is received, then the wallet server computer 104 may verify the authenticity of the transaction.

After the modified scannable image 308' is verified by the wallet server computer 104 and is determined to be from an authentic user and/or mobile device 102, the wallet server computer 104 could respond in a number of ways. In some embodiments, if the modified scannable image 308' is not verified, then the wallet server computer 104 may simply respond with an authorization response message to the merchant computer denying the transaction. In some embodiments, if the modified scannable image 308' is verified by the wallet server computer 104, then wallet server computer 104 may send an indicator to the access device 112 indicating that the modified scannable image 308' has been verified (or has not been verified or has been determined to be untrustworthy). This indicator may then be included in any authorization request message that is sent by the access device 112 to the issuer computer 120, via the acquirer computer 116 and the payment processing network 118. The issuer computer 120 and/or the payment processing network 118 may then make a decision as to whether or not to authorize the transaction, or may use the indicator as an input into their own fraud analysis process.

Assuming that the wallet server computer 104 does not make the final authorization decision and does not prevent the transaction from moving forward, at step 7, the wallet server computer 104 may forward the payment authorization request message to the payment processing network 118. Alternatively, the wallet server computer 104 may forward the payment authorization request message to the access device 112, merchant computer 114, or acquirer computer 116, which may then forward it to the payment processing network 118. The payment processing network 118 may in turn forward the payment authorization request message to an issuer computer 120 associated with the account being used to conduct the transaction. The issuer computer 120 may decide whether or not to authorize the transaction, and may then generate an authorization response message and may send it back to the payment processing network 118.

In some embodiments, the wallet server computer 104 may generate a new authorization request message from the authorization request message that it received from the access device 112. This may be the case if the authorization request message from the access device 112 to the wallet server computer 104 is in one data format (XML) and the authorization request message transmitted by the wallet server computer 104 or by the access device 112 to the payment processing network 118 or issuer computer 120 is in another data format (e.g., ISO 8583). Further, the new authorization request message may have information that is both common to and different from the information in the received authorization request message and the new authorization request message.

At step 8, the payment processing network 118 may forward the authorization response message containing information and send it to the wallet server computer 104. In other embodiments of the invention, the authorization response message may be sent to the acquirer computer 116, and then to the access device 112 via the merchant computer 114.

At step 9, the wallet server computer 104 may send the payment authorization response to the access device 112.

At step 10, after the wallet server computer 104 receives the authorization response message, the wallet server computer 104 may send a transaction completion message to the mobile wallet application 102B-2 on the mobile device 102.

A clearing and settlement process between the issuer computer 120, the acquirer computer 116, and the payment processing network 118 may occur at a later time.

Although the above-described embodiments describes the verification function being performed by the wallet server computer 104, in other embodiments, the described verification functions could be performed on another device or server computer (e.g., computers 114, 116, 118, or 120).

Embodiments of the invention may provide a number of advantages. For example, embodiments of the invention may include a first scannable image with an image portion that can change when the first scannable image is converted to a second, modified scannable image. The second, modified scannable image is only generated at the point of sale. As a result, it is difficult if not impossible for a fraudster to steal the second modified scannable image. Further, even if this was possible, the second, modified scannable image includes data that is dynamic so it would not be used again or it may only be used for a very small number of transactions, thereby limiting risk. Secondly, the modified scannable image may include a portion with encrypted metadata that is relevant to a time T1 and another portion with dynamic data that is relevant to a point in time T2. Two sets of data at different times may be used to verify that the modified scannable code and consequently the payment account number or the payment token is being used by a legitimate mobile device. Thus, embodiments of the invention provide for a high level of data security when access to a resource is desired.

Figure 8:
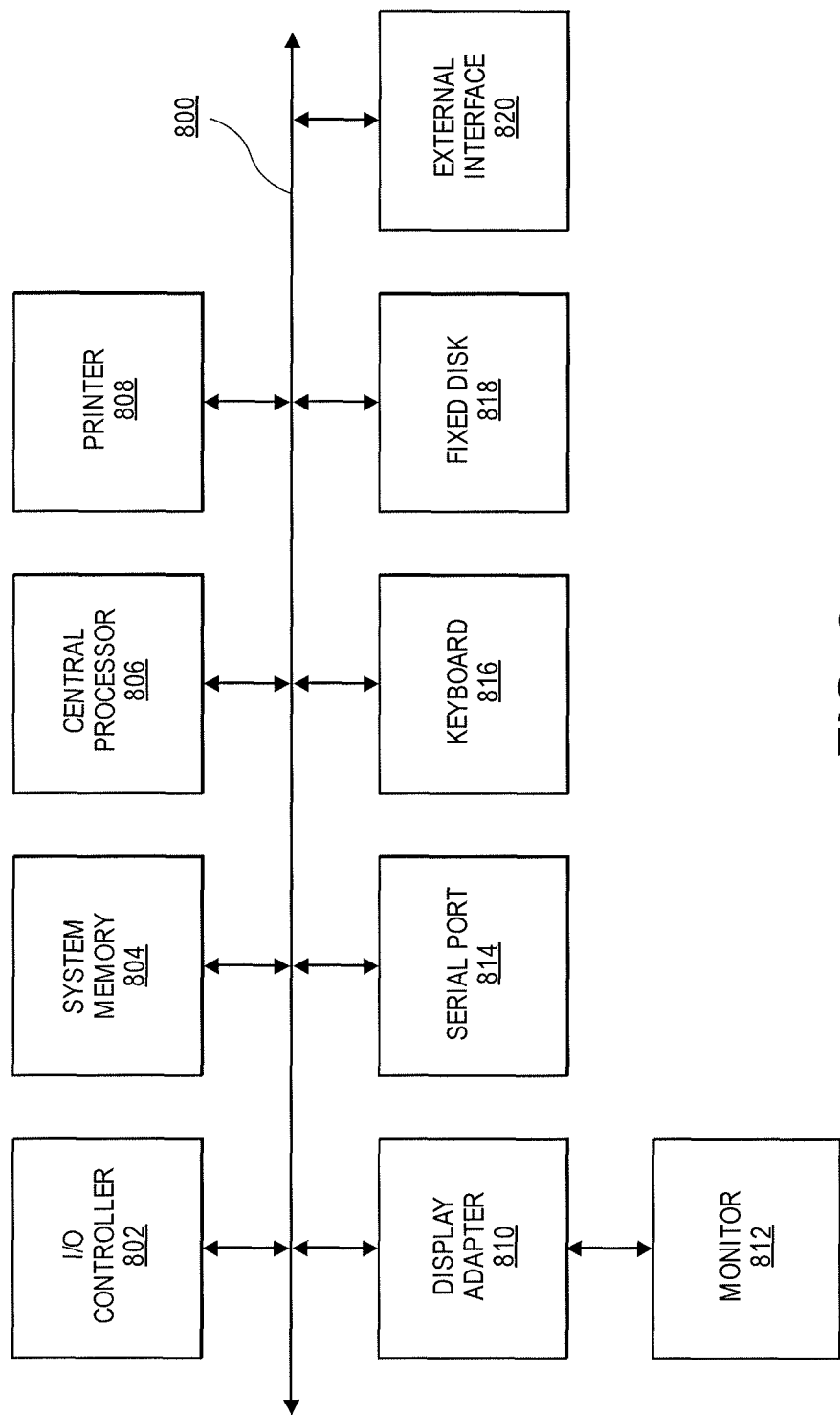
FIG. 8 shows a block diagram of a computer apparatus according to an embodiment of the invention.

FIG. 8 is a high level block diagram of a computer system that may be used to implement any of the entities or components described above. The subsystems shown in FIG. 8 are interconnected via a system bus 800. Additional subsystems include a printer 808, keyboard 816, fixed disk 818, and monitor 812, which is coupled to display adapter 810. Peripherals and input/output (I/O) devices, which couple to I/O controller 802, can be connected to the computer system by any number of means known in the art, such as a serial port. For example, serial port 814 or external interface 820 can be used to connect the computer apparatus to a wide area network such as the Internet, a mouse input device, or a scanner. The interconnection via system bus 800 allows the central processor 806 to communicate with each subsystem and to control the execution of instructions from system memory 804 or the fixed disk 818, as well as the exchange of information between subsystems. The system memory 804 and/or the fixed disk may embody a computer-readable medium.

Figure 9:
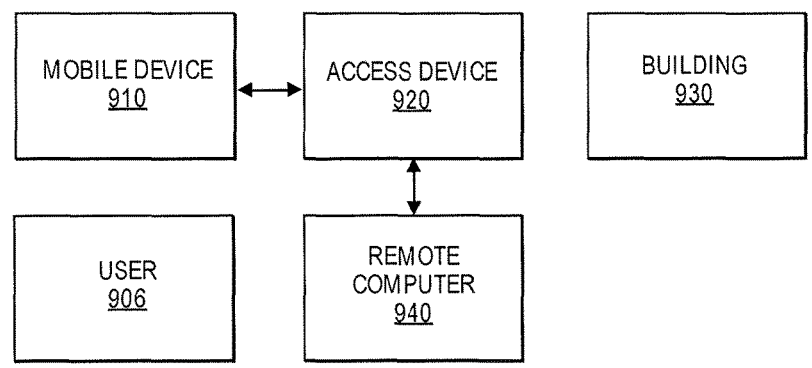
FIG. 9 shows a block diagram of a system that can use a mobile device to access a building.

Embodiments of the invention can apply outside of the context of payment transactions. For example, FIG. 9 shows a block diagram of a building access system. FIG. 9 shows a mobile device 910 operated by a user 906. The mobile device 910 may generate the initial and modified scannable images as described above, and the access device 920 may scan the images as explained above. Instead of the wallet server computer verifying the modified scannable image, the remote computer 940 in FIG. 9 can perform a similar function. After the remote computer 940 verifies that the modified scannable image came from an authentic mobile device 910, the access device 920 may then proceed to let the user 906 enter the building 930.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

receiving, by a first device comprising a processor, a first request initiated by a user for an initial scannable image for a transaction;

generating, by the first device comprising the processor, the initial scannable image, the initial scannable image comprising a first image portion comprising a static image, a second image portion associated with executable code, and a third image portion comprising a first time when the initial scannable image was generated;

displaying, by a display of the first device, the initial scannable image;

displaying, by the display of the first device, an overlay over the initial scannable image preventing the initial scannable image from being read prior to receiving a second request;

after receiving the second request initiated by the user, executing, by the first device, the executable code associated with the second image portion to form a modified second image portion;

displaying, by the display of the first device, a modified scannable image, wherein the modified scannable image comprises the first image portion comprising the static image, the modified second image portion, and the third image portion comprising the first time when the initial scannable image was generated, and wherein the initial scannable image and the modified scannable image are both barcodes;
wherein the modified second image portion in the modified scannable image has a different appearance than the second image portion in the initial scannable image and comprises a second time when the executable code associated with the second image portion was executed; and
providing, data scanned by a second device from the modified scannable image displayed by the first device including at least the second time to a server computer, wherein the server computer compares the second time with time data received from the second device, and authenticates the transaction.

2. The method of claim 1, wherein the first image portion encodes a token.

3. The method of claim 1, wherein the barcodes are two-dimensional machine readable codes.

4. The method of claim 1, further comprising:
receiving the second request at the first device.

5. The method of claim 4, wherein the second request is initiated by the user providing an input to an input element of the first device.

6. The method of claim 4, wherein the second request is initiated by a signal from the second device.

7. The method of claim 1, wherein the executable code is Javascript.

8. The method of claim 1, wherein the second request for the initial scannable image is received from the second device.

9. A first device comprising:
a processor;
a display coupled to the processor; and
a memory element comprising code, executable by the processor, for implementing a method comprising:
receiving a first request initiated by a user for an initial scannable image for a transaction;
generating the initial scannable image, the initial scannable image comprising a first image portion comprising a static image, a second image portion associated with executable code, and a third image portion comprising a first time when the initial scannable image was generated;
displaying, by the display, the initial scannable image;
displaying, by the display, an overlay over the initial scannable image preventing the initial scannable image from being read prior to receiving a second request;
after receiving the second request initiated by the user, executing the executable code associated with the second image portion to form a modified second image portion;
displaying, by the display, a modified scannable image, wherein the modified scannable image comprises the first image portion comprising the static image, the modified second image portion, and the third image portion comprising the first time when the initial scannable image was generated, and wherein the initial scannable image and the modified scannable image are both barcodes,
wherein the modified second image portion in the modified scannable image has a different appearance than the second image portion in the initial scannable image and comprises a second time when the executable code associated with the second image portion was executed; and
providing, data scanned by a second device from the modified scannable image displayed by the first device including at least the second time to a server computer, wherein the server computer compares the second time with time data received from the second device, and authenticates the transaction.

10. The first device of claim 9, wherein the first image portion encodes a token.

11. The first device of claim 9, barcodes are two-dimensional machine readable codes.

12. The first device of claim 9, wherein the method further comprises:
receiving the second request at the first device.

13. The first device of claim 12, wherein the second request is initiated by the user providing an input to an input element of the first device.

14. The first device of claim 12, wherein the second request is initiated by a signal from the second device.

15. The first device of claim 9, wherein the executable code is Javascript.

16. The first device of claim 9, wherein the second request for the initial scannable image is received from the second device.

17. A system comprising:
a first device comprising a processor; a display coupled to the processor; and a memory element comprising code, executable by the processor, for implementing a method comprising
receiving a first request initiated by a user for an initial scannable image for a transaction,
generating the initial scannable image, the initial scannable image comprising a first image portion comprising a static image, a second image portion associated with executable code, and a third image portion comprising a first time when the initial scannable image was generated,
displaying, by the display, the initial scannable image,
displaying, by the display, an overlay over the initial scannable image preventing the initial scannable image from being read prior to receiving a second request,
after receiving the second request initiated by the user, executing the executable code associated with the second image portion to form a modified second image portion,
displaying, by the display, a modified scannable image, wherein the modified scannable image comprises the first image portion comprising the static image, the modified second image portion, and the third image portion comprising the first time when the initial scannable image was generated, and wherein the initial scannable image and the modified scannable image are both barcodes,
and wherein the modified second image portion in the modified scannable image has a different appearance than the second image portion in the initial scannable image and comprises a second time when the executable code associated with the second image portion was executed, and
a second device configured to scan the modified scannable image and obtain data from the scanned modified image including at least the second time,
and
a server computer configured to receive data obtained from the scanned modified image including at least the second time, compare the second time with time data received from the second device, and authenticate the transaction.

\* \* \* \* \*